United States Patent
Yousef

(10) Patent No.: US 7,907,637 B2
(45) Date of Patent: Mar. 15, 2011

(54) FAST ACQUISITION IN MOBILE MULTIMEDIA MULTICAST SYSTEMS

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 343 days.

(21) Appl. No.: 12/062,734

(22) Filed: Apr. 4, 2008

(65) Prior Publication Data

US 2009/0252256 A1    Oct. 8, 2009

(51) Int. Cl.
    *H04B 3/10* (2006.01)
(52) U.S. Cl. ............................................... 370/491
(58) Field of Classification Search ............ 370/491, 370/203, 432
    See application file for complete search history.

(56) References Cited

U.S. PATENT DOCUMENTS

| 7,653,152 B2* | 1/2010 | Al-Eidan | 375/334 |
| 2007/0066313 A1* | 3/2007 | Collins et al. | 455/445 |
| 2007/0070963 A1* | 3/2007 | Li et al. | 370/338 |
| 2007/0183302 A1* | 8/2007 | Stockert | 370/203 |

* cited by examiner

*Primary Examiner* — Derrick W Ferris
*Assistant Examiner* — Mohammad Anwar
(74) *Attorney, Agent, or Firm* — Rahman LLC

(57) ABSTRACT

A technique of acquisition in a MediaFLO™ (Forward Link Only) mobile multimedia multicast system, wherein the method comprises receiving a superframe comprising a first digital symbol in a receiver operating in a first state of operation; assuming the first received digital symbol to be a Time Division Multiplexed (TDM) pilot symbol; calculating a first sparseness index of the first symbol; storing the first sparseness index; operating the receiver in a second state of operation; receiving a second digital symbol; calculating a second sparseness index for the second digital symbol; the receiver remaining in the second state of operation when the second sparseness index is greater than the first sparseness index, wherein the second digital symbol is assumed to be the TDM pilot symbol; and verifying that the last assumed TDM pilot symbol is the correct TDM pilot of the superframe.

16 Claims, 10 Drawing Sheets

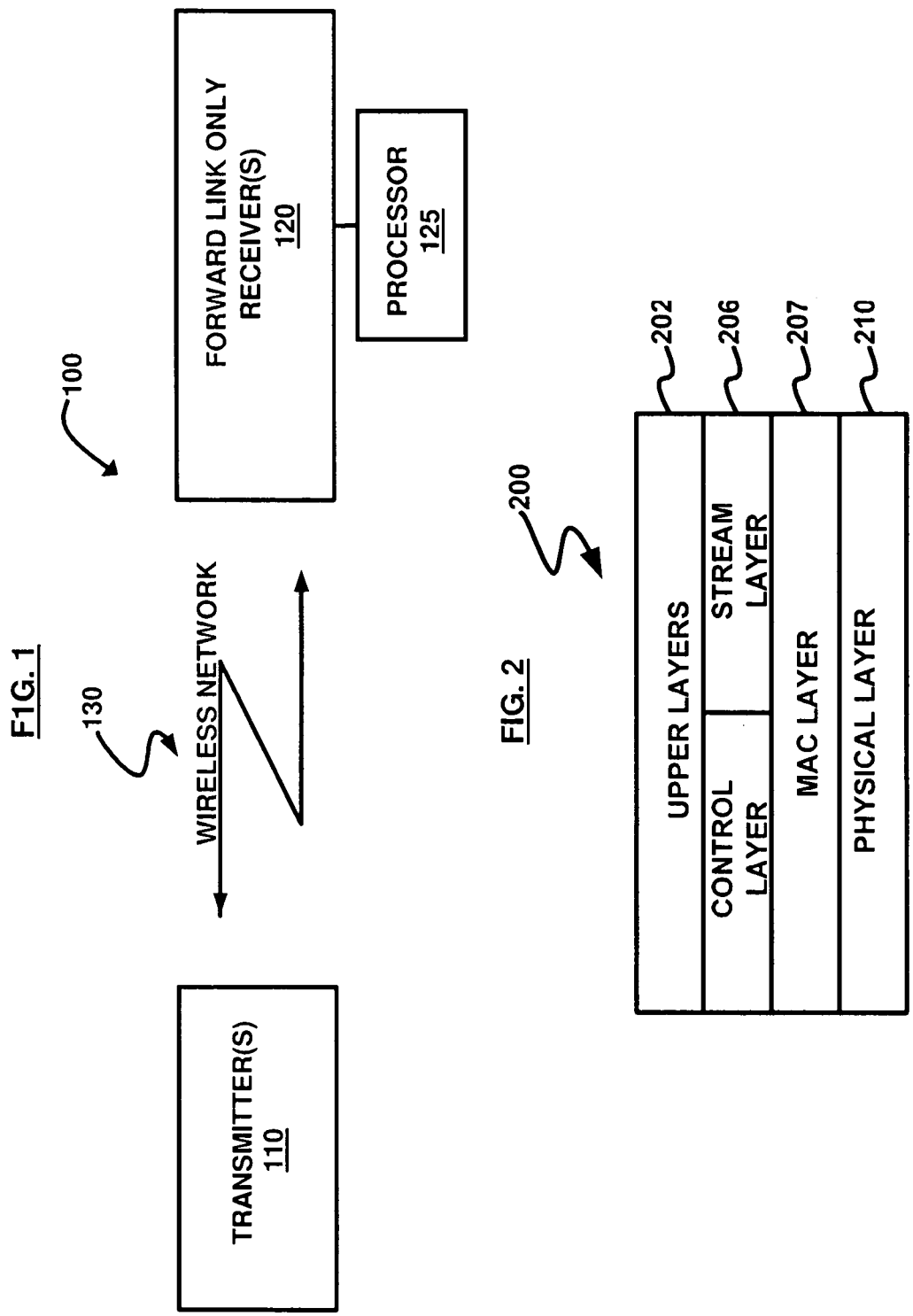

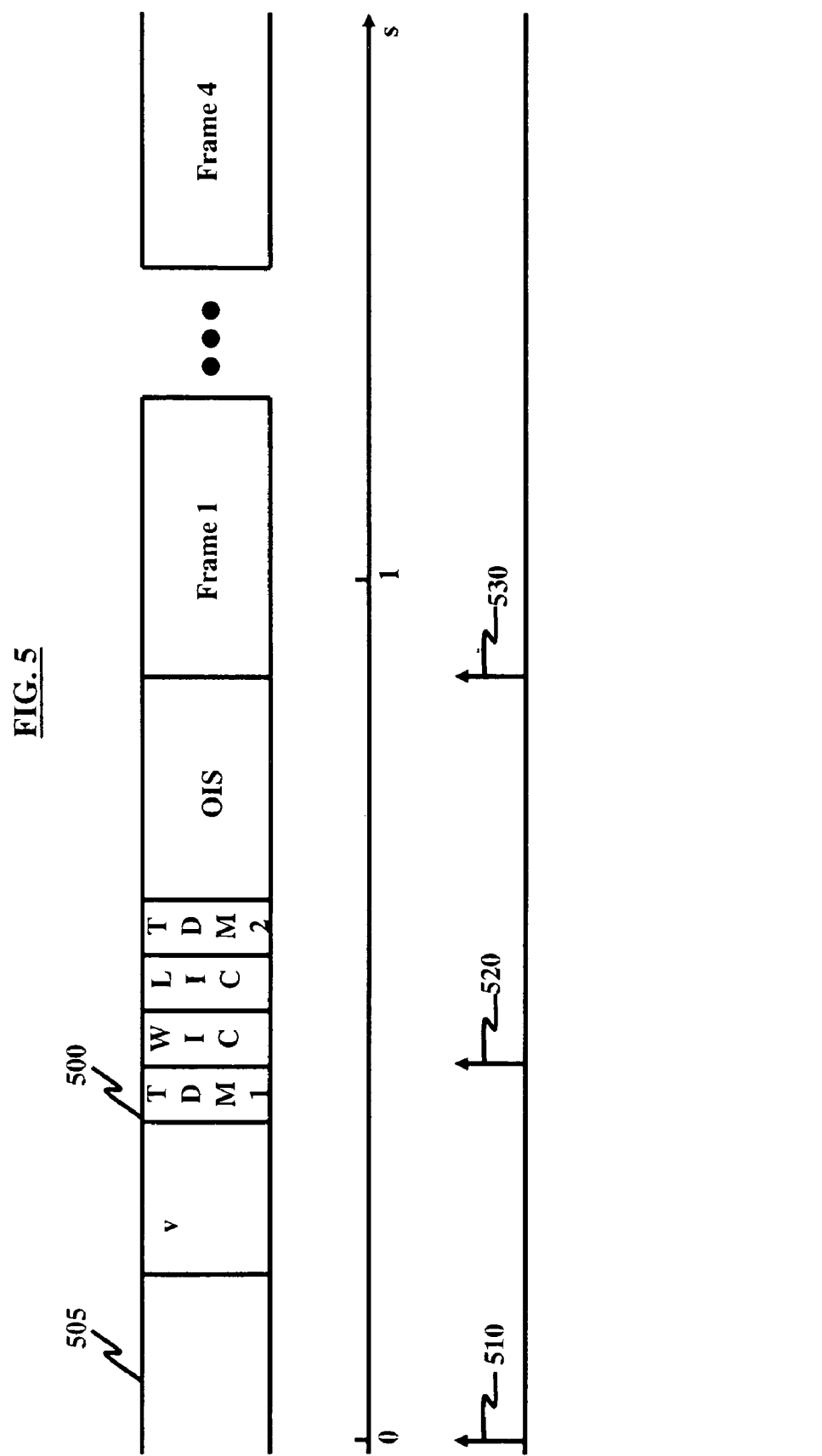

FAST ACQUISITION IN MOBILE MULTIMEDIA MULTICAST SYSTEMS

BACKGROUND

1. Technical Field

The embodiments herein generally relate to wireless communications, and, more particularly, to methods and apparatus for acquisition of a beginning of a superframe for a MediaFLO™ (Forward Link Only) mobile multimedia multicast system.

2. Description of the Related Art

In recent years, the wireless industry has seen explosive growth in device capability, especially in relation to mobile devices, such as cell phones, handhelds, gaming consoles, etc. Ever-increasing demand for computing power, memory, and high-end graphic functionalities has accelerated the development of new and exciting wireless services. In the last few years, multiple technologies have been proposed to address delivery of streaming multimedia to mobile devices.

Multimedia communications provide a rich and immediate environment of image, graphics, sound, text and interaction through a range of technologies. An example of multimedia communication is streaming multimedia which is primarily a delivery of continuous synchronized media data. The streaming multimedia is constantly received by, and displayed to an end user while it is being delivered by a provider. Multiple technologies such as Integrated Services Digital Broadcasting-Terrestrial (ISDB-T), Terrestrial-Digital Multimedia Broadcasting (T-DMB), Satellite-Digital Multimedia Broadcasting (S-DMB), Digital Video Broadcasting-Handheld (DVB-H), and FLO (Forward Link Only) are used to address the delivery of streaming multimedia to mobile devices. These technologies have typically leveraged upon either third generation cellular/PCS, or digital terrestrial TV broadcast technologies.

For delivering unprecedented volumes of high-quality, streaming or clipped, audio and video multimedia to wireless subscribers, an air interface has been developed based on FLO technology for MediaFLO™ mobile multimedia multicast system available from Qualcomm, Inc., California, USA. MediaFLO™ or media forward link only is a combination of the media distribution system and the FLO technology. The FLO technology is the ability to deliver a rich variety of content choice to consumers while efficiently utilizing spectrum as well as effectively managing capital and operating expenses for service providers. The details of the MediaFLO™ mobile multimedia multicast system are available in Chari, M. et al., "FLO Physical Layer: An Overview," IEEE Transactions on Broadcasting, Vol. 53, No. 1, March 2007, the contents of which, in its entirety, is herein incorporated by reference.

FLO technology was designed specifically for the efficient and economical distribution of the same multimedia content to millions of wireless subscribers simultaneously. Also, the FLO technology was designed from the ground up to be a multicasting network, which is overlaid upon a cellular network. It does not need to support any backward compatibility constraints. Thus, both the network infrastructure and the receiver devices are separate from those for the cellular/PCS network. Moreover, as the name suggests, the technology relies on the use of a forward link (network to device) only.

FLO enables reducing the cost of delivering such content and enhancing the user experience, allowing consumers to "surf" channels of content on the same mobile handsets they use for traditional cellular voice and data services.

MediaFLO™ technology can provide robust mobile performance and high capacity without compromising power consumption. The technology also reduces the network cost of delivering multimedia content by dramatically decreasing the number of transmitters needed to be deployed. In addition, MediaFLO™ technology-based multimedia multicasting complements wireless operators' cellular network data and voice services, delivering content to the same cellular handsets used on 3G networks.

The MediaFLO™ wireless system has been designed to broadcast real time audio and video signals, apart from non-real time services to mobile users. The system complements existing networks and radically expands the ability to deliver desired content without impacting the voice and data services. Operators can leverage the MediaFLO™ system to increase average revenue per user (ARPU) and reduce churn by offering enhanced multimedia services. Content providers can take advantage of a new distribution channel to extend their brand to mobile users. Device manufacturers will benefit from increased demand for multimedia-enabled handsets as consumer appetite grows for the rich content provided through MediaFLO™ systems.

The MediaFLO™ service is designed to provide the user with a viewing experience similar to a television viewing experience by providing a familiar type of program-guide user interface. Users can simply select a presentation package, or grouping of programs, just as they would select a channel to subscribe to on television. Once the programs are selected and subscribed to, the user can view the available programming content at any time. In addition to viewing high quality video and audio content and IP data, the user may also have access to related interactive services, including the option to purchase a music album, ring tone, or download of a song featured in a music program. The user can also purchase access to on-demand video programming, above and beyond the content featured on the program guide.

The respective MediaFLO™ system transmission is carried out using tall and high power transmitters to ensure wide coverage in a given geographical area. Further, it is common to deploy 3-4 transmitters in most markets to ensure that the MediaFLO™ system signal reaches a significant portion of the population in a given market. During the acquisition process of a MediaFLO™ system data packet several determinations and computations are made to determine such aspects as frequency offsets for the respective wireless receiver. Given the nature of MediaFLO™ system broadcasts that support multimedia data acquisitions, efficient processing of such data and associated overhead information is paramount. For instance, when determining frequency offsets or other parameters, complex processing and determinations are required where determinations of phase and associated angles are employed to facilitate the MediaFLO™ system transmission and reception of data. Accordingly, there remains a need for an efficient processing of data and associated overhead information in a mobile multimedia multicast system.

SUMMARY

In view of the foregoing, an embodiment herein provides a method of acquisition in a MediaFLO™ (Forward Link Only) mobile multimedia multicast system, and a program storage device readable by computer, tangibly embodying a program of instructions executable by the computer to perform the method of acquisition in a MediaFLO™ (Forward Link Only) mobile multimedia multicast system, wherein the method comprises receiving a superframe comprising a first digital symbol in a receiver operating in a first state of operation;

assuming the first received digital symbol to be a Time Division Multiplexed (TDM) pilot symbol; calculating a first sparseness index of the first symbol; storing the first sparseness index; operating the receiver in a second state of operation; receiving a second digital symbol; calculating a second sparseness index for the second digital symbol; the receiver remaining in the second state of operation when the second sparseness index is greater than the first sparseness index, wherein the second digital symbol is assumed to be the TDM pilot symbol; and verifying that the last assumed TDM pilot symbol is the correct TDM pilot of the superframe.

Moreover, when the second sparseness index is less than the first sparseness index, then the method may further comprise the receiver assuming the second digital symbol is a Wide-area Identification Channel (WIC) symbol; and the receiver switching to a third state of operation. Furthermore, the method may further comprise receiving additional new digital symbols; comparing a sparseness index of each additional digital symbols with the first sparseness index; and the receiver switching to the second state of operation whenever a sparseness index of a newly received digital symbol is greater than the first sparseness index.

Additionally, when the sparseness index of the newly received digital symbol is less than the first sparseness index, then the method may further comprise the receiver switching to a fourth state of operation; the receiver switching to a fifth state of operation upon completion of the fourth state of operation; the receiver switching to a sixth state of operation upon completion of the fifth state of operation; and the receiver switching to a seventh state of operation upon completion of the sixth state of operation.

Moreover, the method may further comprise the receiver remaining in the seventh state of operation as long as each newly arriving digital symbol has a smaller sparseness index than the first sparseness index. Furthermore, the method may further comprise the receiver switching to an eighth state of operation when the receiver resides in the seventh state of operation for five consecutive received digital symbols. Additionally, the method may further comprise comparing a sparseness index of the newly received digital symbol with the first sparseness index; and when a sparseness index of the newly received digital signal is less than the first sparseness index, the method may further comprise performing a turbo-decoding process on Overhead Information symbols (OIS) of the superframe; and checking erasure fields of the superframe for errors.

Moreover, when the erasure fields are correct, the method may further comprise the receiver switching to a ninth state of operation which signifies an end of an acquisition phase, and wherein the last assumed TDM pilot symbol is determined to be the correct TDM pilot symbol. Furthermore, when the erasure fields are non-zero, then the method may further comprise the receiver switching to the first state of operation; and the method repeating.

Another embodiment includes a receiver comprising a processor adapted to: receive a superframe comprising a first digital symbol in the receiver operating in a first state of operation; assume the first received digital symbol to be a Time Division Multiplexed (TDM) pilot symbol; calculate a first sparseness index of the first symbol; store the first sparseness index; operate the receiver in a second state of operation; receive a second digital symbol; calculate a second sparseness index for the second digital symbol, wherein the receiver remains in the second state of operation when the second sparseness index is greater than the first sparseness index, wherein the second digital symbol is assumed to be the TDM pilot symbol; and verify that the last assumed TDM pilot symbol is the correct TDM pilot of the superframe. Preferably, the receiver performs acquisition in a MediaFLO™ (Forward Link Only) mobile multimedia multicast system.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 illustrates a FLO system for a MediaFLO™ system according to an embodiment herein;

FIG. 2 illustrates a layering architecture for an air interface of a FLO system according to an embodiment herein;

FIG. 5 illustrates a fast acquisition process for MediaFLO™ systems in accordance with an embodiment herein;

DETAILED DESCRIPTION OF PREFERRED EMBODIMENTS

Figure 3:
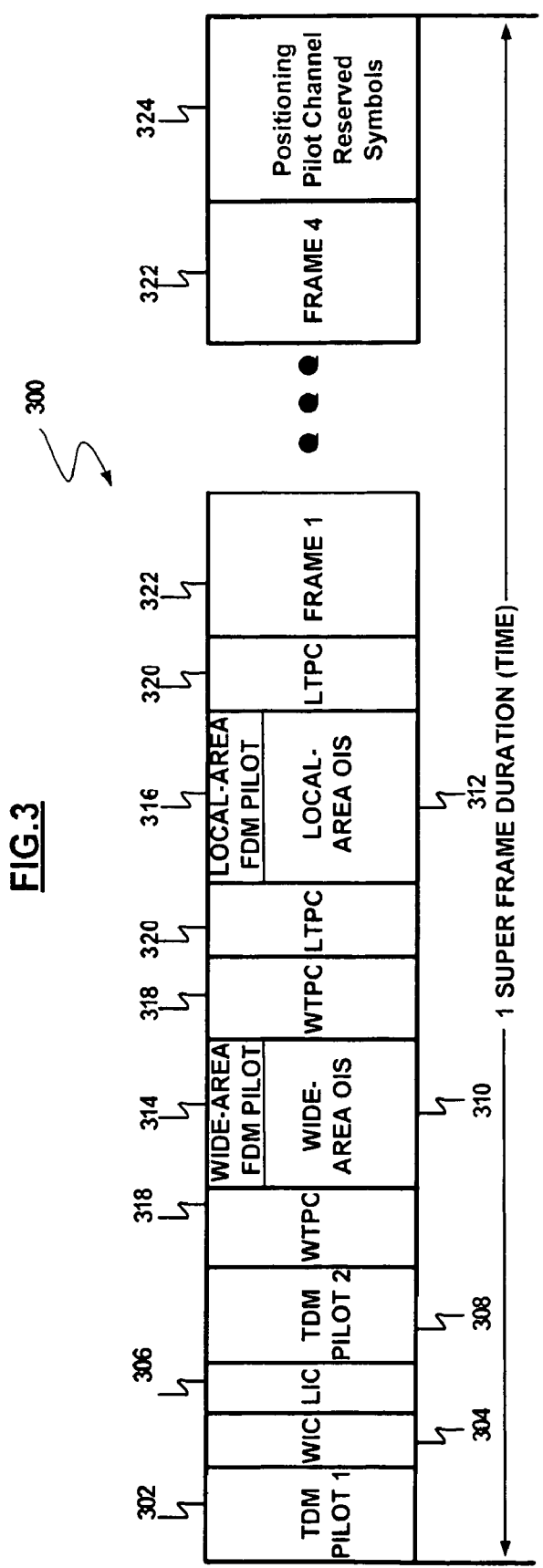
FIG. 3 illustrates a FLO superframe structure for a MediaFLO™ system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an efficient processing of data and associated overhead information in a mobile multimedia multicast system. The embodiments herein achieve this by providing a technique of fast acquisition so that the receivers need not wait for the coming superframe to extract the next symbol. Referring now to the drawings, and more particularly to FIGS. 1 through 10, where similar reference characters denote corresponding features consistently throughout the figures, there are shown preferred embodiments.

The FLO system is comprised of two parts: (a) The FLO network, which includes the collection of transmitters and the backhaul network, and (b) The FLO device, which may be any type of communicating devices such as a cell phone, computer, personal assistant, laptop, handheld, or gaming consoles, etc. FIG. 1 illustrates a FLO system 100 for a MediaFLO™ system. The system 100 includes one or more transmitters 110 that communicate across a wireless network 130 to one or more receivers 120. A processor 125 receives and processes the digital symbols received by the receiver 120

The FLO system 100 is utilized in developing an air interface for the MediaFLO™ mobile multicast system. The air interface uses Orthogonal Frequency Division Multiplexing (OFDM) as the modulation technique, which is also utilized by Digital Audio Broadcasting (DAB), (DVD-T), and (ISDB-T).

To ensure that the user experience is as uniform as possible over the entire coverage area and optimize spectral efficiency and network economics, FLO system 100 employs the concept of Single Frequency Network (SFN) operation.

The FLO system 100 multicasts several services. A service is an aggregation of one or more related data components, such as the video, audio, text or signaling associated with a service. In an embodiment, the services are classified into two types based on their coverage area: Wide-area services and Local-area services. A Local-area service is multicast for reception within a metropolitan area. By contrast, Wide-area services are multicast in one or more metropolitan areas. The term Local-area is used to denote the transmitters within a metropolitan area. The term Wide-area is used to denote transmitters in one or more metropolitan areas that multicast the same Wide-area services. Thus, a Wide-area contains one or more Local-areas, with the transmitters in the different Local-areas multicasting different local area services and in an embodiment, using different radio frequency (RF) center frequencies.

FLO services are carried over one or more logical channels. These logical channels are called Multicast Logical Channels (MLC). An important aspect is that MLCs are distinguishable at the physical layer. For example, the video and audio components of a given service can be sent on two different MLCs. A FLO device (a receiver from the plurality of receivers 120) that is interested in the audio component can only receive the corresponding MLC without receiving the MLC for the video component, thereby saving battery resources.

The statistical multiplexing of different services, or MLCs, is achieved by varying only the MLC time and frequency allocations over prescribed time intervals to match the variability in the MLC's source rates. Statistical multiplexing in FLO enables the receivers 120 to demodulate and decode only the MLC(s) of interest.

The data rates required by the services are expected to vary over a wide range, depending on their multimedia content. Thus, effective use of statistical multiplexing can significantly increase the number of services supported by a multicast system using a specified channel bandwidth.

FIG. 2 illustrates a layering architecture 200 for an air interface of a FLO system. The air interface is layered with the interface defined for each layer. The layers are as follows:

The upper layers 202 provide multiple functions including compression of multimedia content, access control to multimedia, and content and formatting of control information. The Medium Access Control (MAC) layer 207 controls access to the physical layer 210, performs the mapping between logical channels and physical channels, multiplexes logical channels for transmission over the physical channel, de-multiplexes the logical channels at the mobile device, and enforces Quality of service (QOS) requirements.

The stream layer (and accompanying control layer) 206 provides binding of the upper layers 202 packets to streams of each logical channels and packetization residual error handling functions. The physical layer 210 provides channel structure for the forward link and defines frequency, modulation, and encoding requirements.

At each transmitter 110 (of FIG. 1), the transmitted MLCs of the FLO system 100 (of FIG. 1) are organized as superframes. In an embodiment, a superframe is of one second duration and comprises 1200 OFDM symbols of 0.833 ms duration each. In an embodiment, each superframe comprises 200 OFDM symbols per MHz of allocated bandwidth, as each of the OFDM symbol is of 0.833 ms duration.

FIG. 3 illustrates a FLO superframe structure 300 for a MediaFLO™ system. The transmission and reception in the FLO system are based on using 4096 (4K) subcarriers. The selection of 4096 subcarriers in FLO provides superior mobile performance compared to 2048 (2K) and 8192 (8K) subcarriers. Of the 4096 subcarriers, 96 are unused and referred to as guard subcarriers. The remaining 4000 subcarriers are referred to as active subcarriers, which are modulated by data or pilot symbols. In an embodiment, these 4000 active subcarriers are further equally divided into eight disjoint groups called interlaces. One interlace from the group is assigned to the Frequency Division Multiplexing (FDM) pilot and is used for channel estimation. The remaining seven interlaces are available for modulation with data symbols. The pilot and data subcarriers are modulated with symbols that have the same energy in the FLO system. These interlaces are allocated to MLC(s) and enable frequency-division multiplexing. Since, the subcarriers within an interlace span the total FLO signal bandwidth there is no loss of frequency diversity.

Forward error correction and coding can also be used to gain the benefit of OFDM over time/frequency-selective channels. In an embodiment, the FLO design uses a concatenated coding scheme, comprising of an outer Reed Solomon (RS) code and an inner Parallel Concatenated Convolution code (PCCC), also called as a turbo code.

As illustrated in FIG. 3, a superframe is divided into Time Division Multiplexed (TDM) pilot OFDM symbols, frequency division multiplexed (FDM) pilot channel with Overhead Information symbols (OIS) channel, Transition Pilot Channels (TPC) symbols 318, 320, data channels 322, and Positioning Pilot Channel (PPC) 324.

There are four TDM pilot OFDM symbols namely TDM pilot 1 (TDM1) 302, Wide-area Identification Channel (WIC) 304, Local-area Identification Channel (LIC) 306, and TDM pilot 2 (TDM2) 308.

The OIS channel is divided into two sections namely the Wide-area OIS channel 310, and Local-area OIS channel 312, each comprising five OFDM symbols that carry overhead information. The Wide-area OIS channel 310 contains information about those MLCs that are common to the wide area, while the Local-area OIS channel 312 contains information about those MLCs that are common to specific local coverage areas.

Similar to the OIS channel, a FDM pilot channel is divided into two sections namely the Wide-area FDM pilot channel 314 and the Local-area FDM pilot channel 316. The TPCs 318, 320 are symbols flanking each continuous portion of the Local-area OIS 312, Wide-area OIS 310, Local-area data frames and Wide-area data frames. The TPC symbols are used to assist channel estimation for demodulation of the data OFDM symbol adjacent to them.

The four data channels 322 occupy a substantial portion of the superframe 300 and carry the multicast multimedia information to the FLO receivers 120 of FIG. 1. The PPC 324 forms the last portion of a superframe 300 and comprises 2, 6, 10, or 14 OFDM symbols. The PPC symbol is unique for each transmitter 110 of FIG. 1 and in an embodiment, is used for transmitter identification. In an embodiment the PPC is used for position location of the receiving device using triangulation methods.

At the FLO receivers 120 of FIG. 1, the received superframe 300 of FIG. 3 is processed for the timing and frequency acquisition. Timing and frequency acquisition in MediaFLO™ mobile multimedia multicast systems is a sequence of stages after which the receiver 120 can begin processing on received superframes 300. In acquiring the beginning of a superframe 300, a complete superframe 300 is lost in order to determine the location of the TDM pilot 1 302 and then the receiver 120 can extract the next symbol based on the TDM1 location. A superframe is lost because by the time a whole superframe is received, the beginning of the superframe (TDM1)+the OIS symbols which indicate the location of requested MLC to be decoded inside the superframe, is not yet determined.

Figure 4:
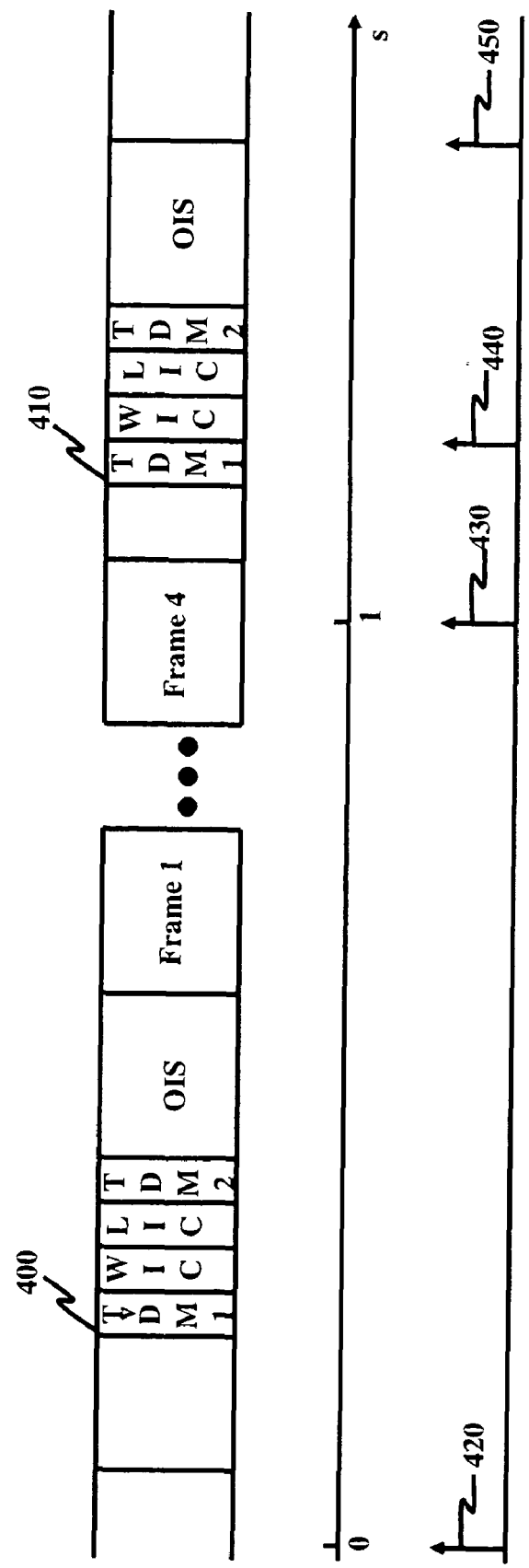
FIG. 4 illustrates acquisition in a MediaFLO™ system performed conventionally.

Thus, estimation of overhead symbols (TDM Pilots 302, 308 and OIS symbols 310, 316) is a sequential process in which estimation of one symbol takes one superframe 300 in time and then the estimation of the next overhead symbol can begin after the location of TDM pilot 1 302 has been estimated. FIG. 4 illustrates acquisition in a MediaFLO™ system performed conventionally. As illustrated in FIG. 4, a superframe 400 is lost in determining the location of the TDM pilot 1. The estimation of the TDM pilot 1 starts at point 420 and by the time the estimation of the TDM pilot 1 is complete at point 430, the superframe 400 is lost. The estimation of the overhead symbols (TDM pilots and OIS symbols) starts with the next superframe 410 at point 440. A Frame Sequence Check (FCS) is performed at point 450 to determine if the OIS symbols are extracted correctly. The FCS bits are the bits appended to the useful transmitted bits for OIS confirmation such that when the OIS packets are turbo decoded and the FCS bits arew correct, then, OIS are confirmed correct. If any of the FCS fields is non-zero, then, this indicates that the packets received are not OIS packets.

As shown in FIG. 4, acquisition takes a long time and the worst case occurs if the receiver 120 of FIG. 1 starts the TDM1 estimation process just after the TDM1 symbol. In this case, two complete seconds are used for the acquisition process as acquisition is complete after two superframes 400, 410.

FIG. 5 illustrates a fast acquisition process for Media FLO systems in accordance with an embodiment herein. This process speeds up the conventional acquisition process so that the receiver 120 of FIG. 1 is not required to wait for the coming superframe 500 to extract the next symbol. According to the embodiments herein, the estimation of TDM pilot 1, Wide-Area Differentiator (WID), Local-Area Differentiator (LID), and OIS symbols starts simultaneously at point 510 to speed up the acquisition process. In performing acquisition through conventional methods, the maximum acquisition time is 2 seconds. However, using the embodiments of the invention, the maximum acquisition time is 1 second. The receivers 120 of FIG. 1 assume that the first symbol 505 investigated is the TDM pilot 1. The sparseness index of the assumed TDM pilot 1 is determined and is stored in memory in the receiver 120. Thus, the receivers 120 of FIG. 1 at this state are in a 'TDM pilot 1 Extracted' state. The true TDM pilot 1 candidate is investigated at point 520. However, it is not confirmed whether the true TDM pilot 1 candidate investigated at 520 is the actual TDM pilot 1.

At point 530, it is determined if the OIS packets received are correct. The OIS packets received are confirmed correct by using the FCS bits appended to the useful transmitted bits. If the FCS bits are correct after the OIS packets have been turbo decoded, then the OIS packets are confirmed correct. However, if any of the FCS fields is non-zero, then, this indicates that the received OIS packets are not OIS packets. If the OIS packets received are correct, the TDM pilot 1 symbol that has been assumed to be the TDM pilot 1 is the correct TDM pilot 1 symbol. After, confirmation of the TDM pilot 1 symbol, the WID, LID and OIS symbol estimates are confirmed to be correct.

During the process of estimation of the TDM pilots, if any symbol is chosen as a better TDM pilot 1 candidate, then, the estimation of the WID, LID and OIS symbols is re-estimated. TDM pilot 1 estimation process is outside the scope of the invention, where the sparseness of the symbol is checked and as the TDM1 is the most sparse symbol within a superframe, the symbol corresponding to the highest sparseness of 1200 symbols is the TDM1 symbol.

At the location point 530, the acquisition process is complete and the receivers 120 of FIG. 1 can start decoding the received superframes 300. Thus, it is clear from FIG. 5 that the acquisition process is complete before the loss of a superframe 500 and thus, the acquisition delay is reduced. Also, it is seen that in case the receivers 120 start acquisition just after the TDM pilot 1 symbol (worst case), the delay is only one second.

Figure 6A:
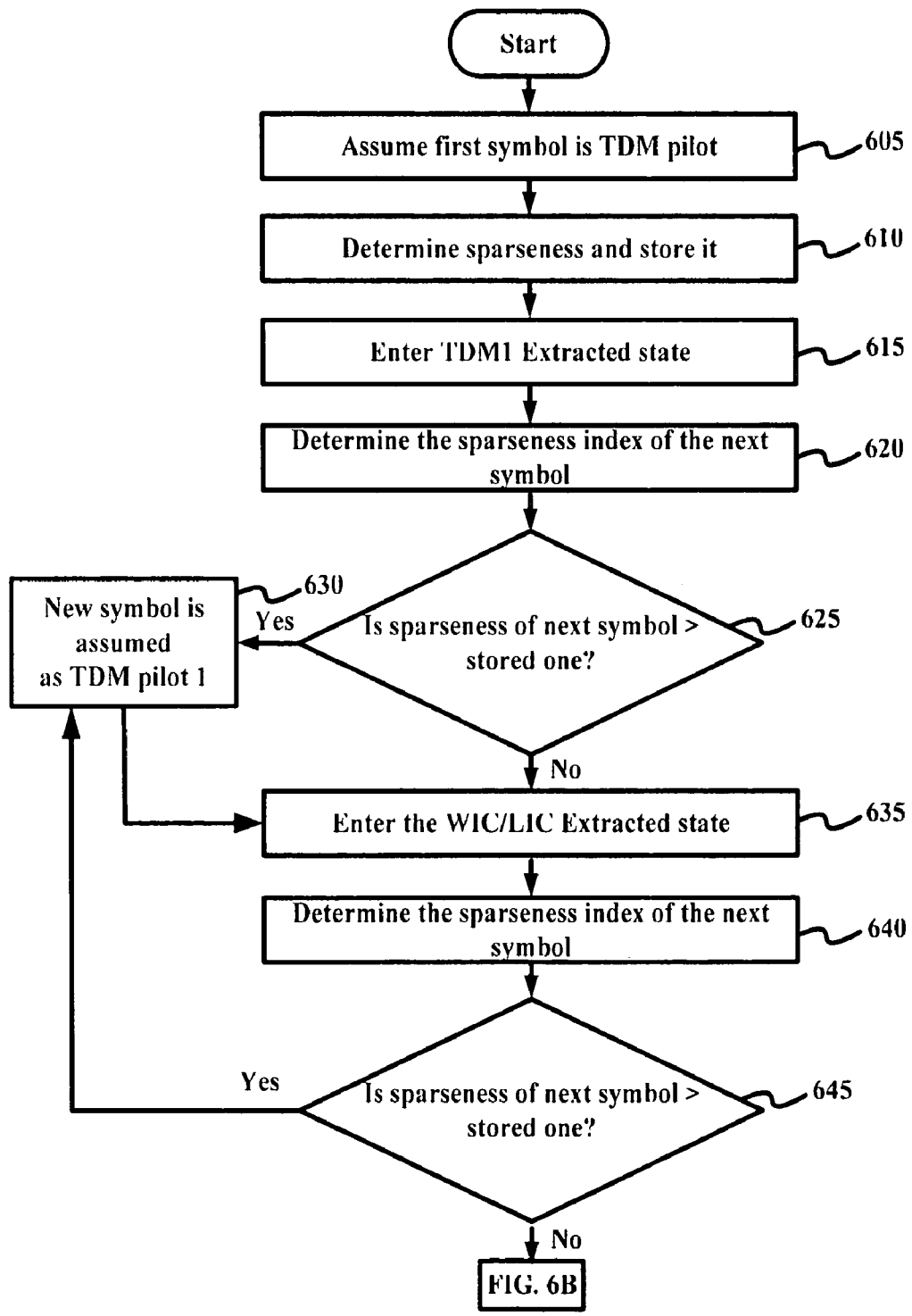
FIGS. 6A, 6B, and 7 illustrate a method of performing fast acquisition for a MediaFLO™ system according to an embodiment herein.
Figure 6B:
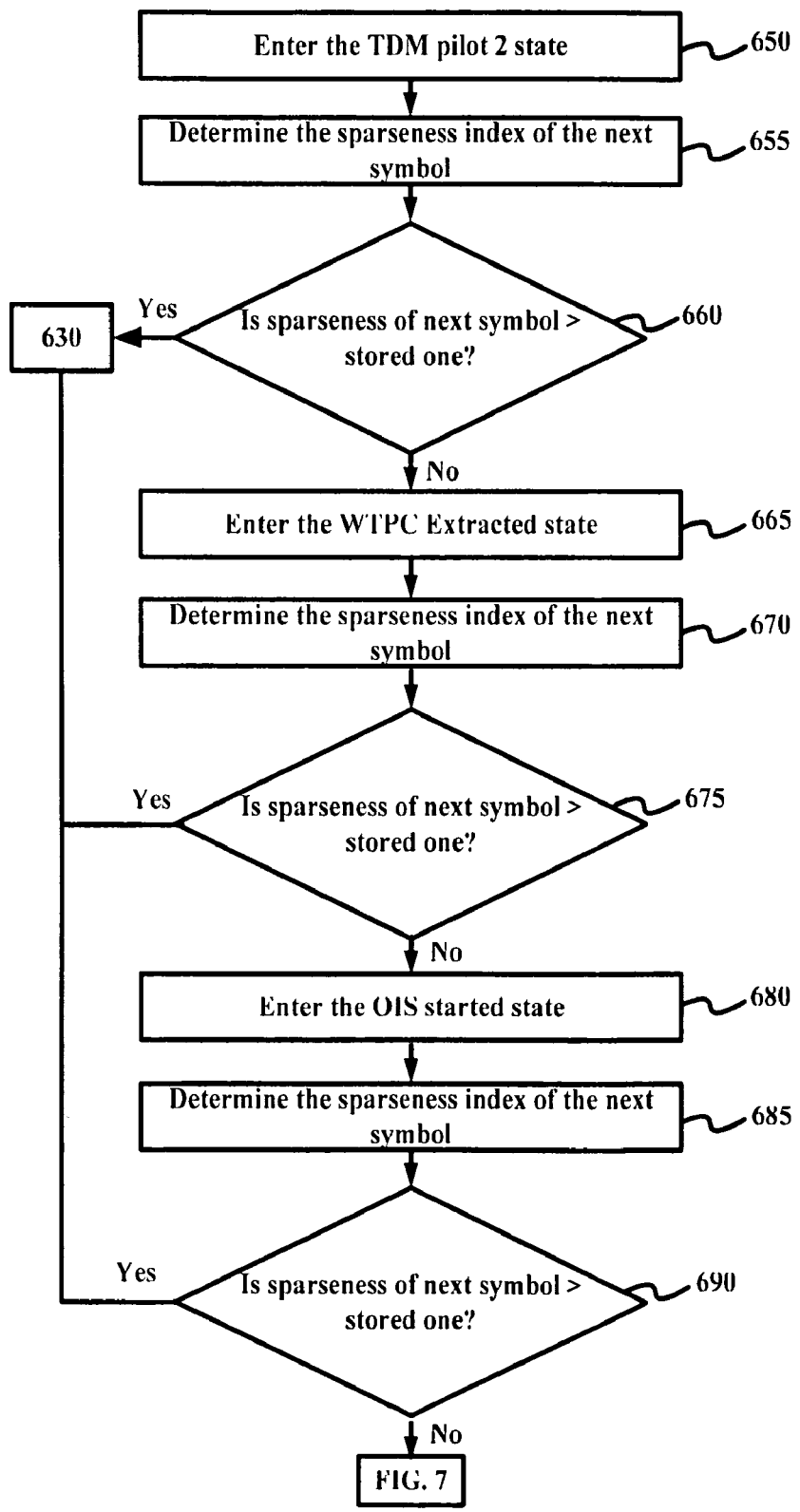
Figure 7:
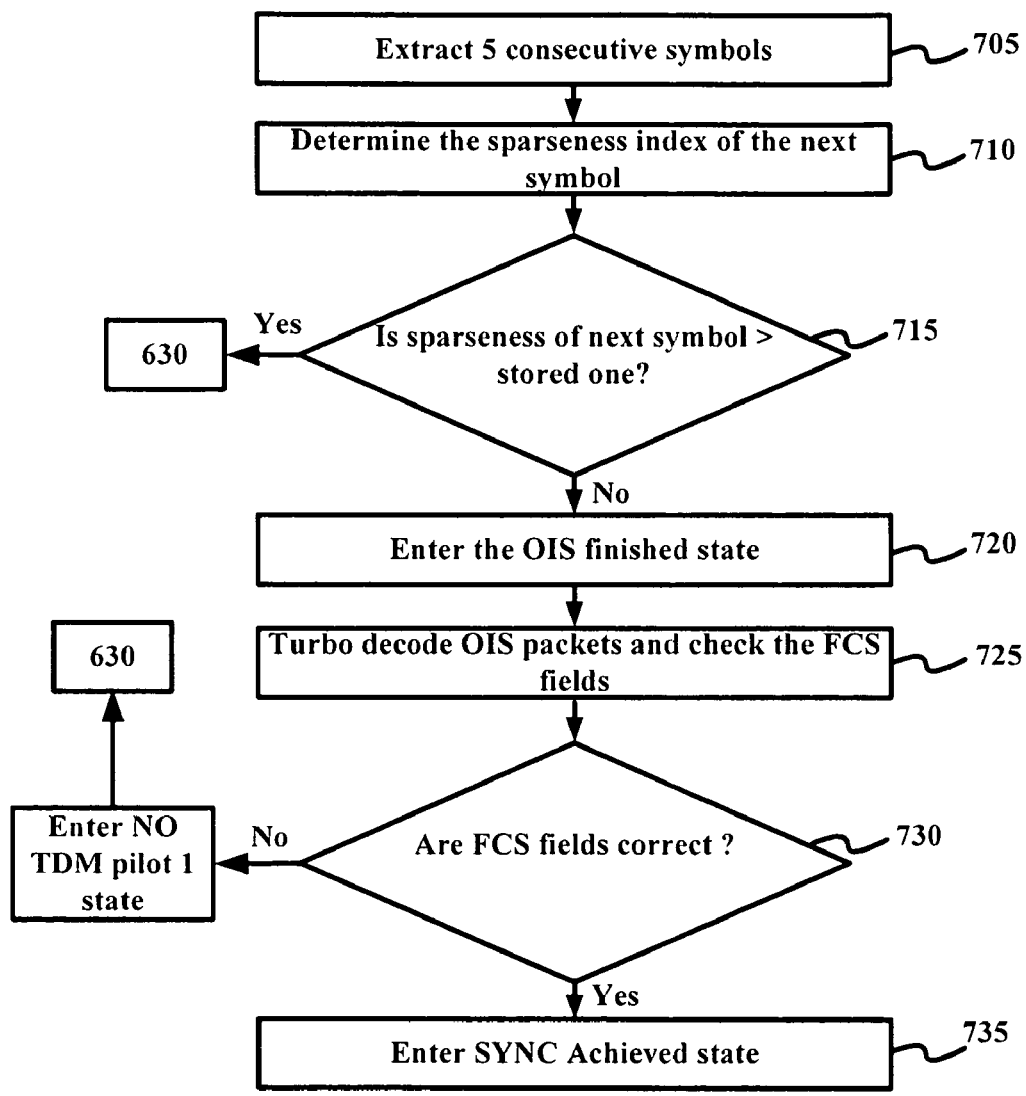

FIGS. 6A, 6B, and 7, with reference to FIGS. 1 through 5, illustrate a method of fast acquisition for a MediaFLO™ system according to the embodiments herein. At block 605, a first investigated symbol 505 is assumed by a receiver 120 to be the TDM pilot 1 symbol. Next, at block 610, a sparseness index of the symbol assumed to be the TDM pilot 1 symbol is determined and stored in memory in the receiver 120. Sparseness index is a computation of peak power of a signal to remaining power. At block 615, the receiver 120 enters a 'TDM Pilot 1 Extracted' state after determining the sparseness index. Moving to block 620, a sparseness index of the next symbol received by the receiver 120 is determined. Next, at block 625, it is determined whether the sparseness index of the next symbol is greater than the stored sparseness index. When the receiver 120 is powered ON, the first symbol in the received superframe is a TDM1 candidate and every coming symbol is a new symbol whose sparseness is determined. In case the sparseness index of the next symbol is greater than the stored sparseness index, at block 630, the new symbol is assumed to be the TDM pilot 1 and the receiver 120 remains in the 'TDM Pilot 1 Extracted' state. After completion of block 630 or if the sparseness index of the next symbol is not greater than the stored sparseness index, at block 635, the receiver 120 goes through the sequence of states 'WIC Extracted', and 'LIC Extracted'. Moving to block 640, a sparseness index of the next symbol received by the receiver 120 is determined. Next, at block 645, it is determined whether the sparseness index of the next symbol is greater than the stored sparseness index. In case the sparseness index of the next symbol is greater than the stored sparseness index at block 645, the new symbol is assumed to be the TDM pilot 1 and the receiver 120 reverts back to the 'TDM Pilot 1 Extracted' state and restarts the same sequence, In FIG. 6B if the sparseness index of the next symbol is not greater than the stored sparseness index the receiver 120 goes to the 'TDM Pilot 2 Extracted' state at block 650, and the sparseness of the next symbol is checked at blocks 655 and 660. If the sparseness of the next symbol is greater than the stored sparseness index, the receiver 120 reverts back to 'TDM pilot1 Extracted' state at block 630. If the sparseness of the next symbol is not greater than the stored sparseness index the receiver 120 enters the 'Wide-Area Transition Pilot Channel (WTPC) Extracted' state at block 665. Next, at blocks 670 and 675 the condition is checked again and in case the sparseness of the next symbol is greater than the stored sparseness index, the receiver 120 goes back to block 630, and if not the receiver 120 proceeds to an 'OIS Started' state. At each of these states, each symbol is processed to be extracted correctly. The processes undergone at each state are outside the scope of the invention and, therefore, the same have been not described herein.

Still referring to FIG. 6B, at block 680, the receiver 120 enters an 'OIS Started state'. Moving to blocks 685 and 690, it is determined whether a sparseness index of the next symbol received is greater than the stored sparseness index. If the sparseness index of the next symbol received is greater than the stored sparseness index, then, at block 630, the receiver 120 switches to the 'TDM Pilot 1 Extracted' state. In an embodiment, the receiver 120 is switched to the 'TDM Pilot 1 Extracted' state through software processing.

In FIG. 7, if the sparseness index of the next symbol received is not greater than the stored sparseness index, then, at block 705, five consecutive symbols are processed by the receiver 120. Five consecutive symbols are processed by the receiver 120 as the number of OIS symbols transmitted per superframe is five. Moving to block 710, the sparseness index of the next symbol received by the receiver 120 is determined. Next, at block 715, it is determined whether the sparseness index of the next symbol received is greater than the stored sparseness index. In case the sparseness index of the next symbol received is greater than the stored sparseness index, then, the receiver 120, proceeds to block 630 and switches to the 'TDM Pilot 1 Extracted' state. In an embodiment, the receiver 120 is switched to the 'TDM Pilot 1 Extracted' state through software processing. If the sparseness index of the next symbol received is not greater than the stored sparseness index, then, the receiver 120 proceeds to block 720 to enter an 'OIS finished' state. Next, at block 725, the OIS packets received by the receiver 120 are turbo decoded and their FCS fields are checked. The FCS bits are the bits appended to the useful transmitted bits for OIS confirmation such that when the OIS packets are turbo decoded and the FCS bits are correct, then, the OIS are confirmed correct. If any of the FCS fields is non-zero, then, this indicates that the packets received are not OIS packets. Next, at block 730, it is determined whether the FCS fields are correct. If all the FCS fields are correct, then, at block 735, the receiver 120 switches to a 'SYNC Achieved' state and the symbol assumed to be the TDM pilot 1 is actually the correct TDM pilot 1 symbol. In an embodiment, the receiver 120 switches to the 'SYNC Achieved' state through software processing. In case the FCS fields are not correct, then, the receiver 120 switches to 'No TDM Pilot 1' state as no symbol assumed as the TDM pilot 1 is the correct TDM pilot 1 symbol. In an embodiment, the receiver 120 switches to the 'No TDM Pilot 1' state through software processing.

Figure 8:
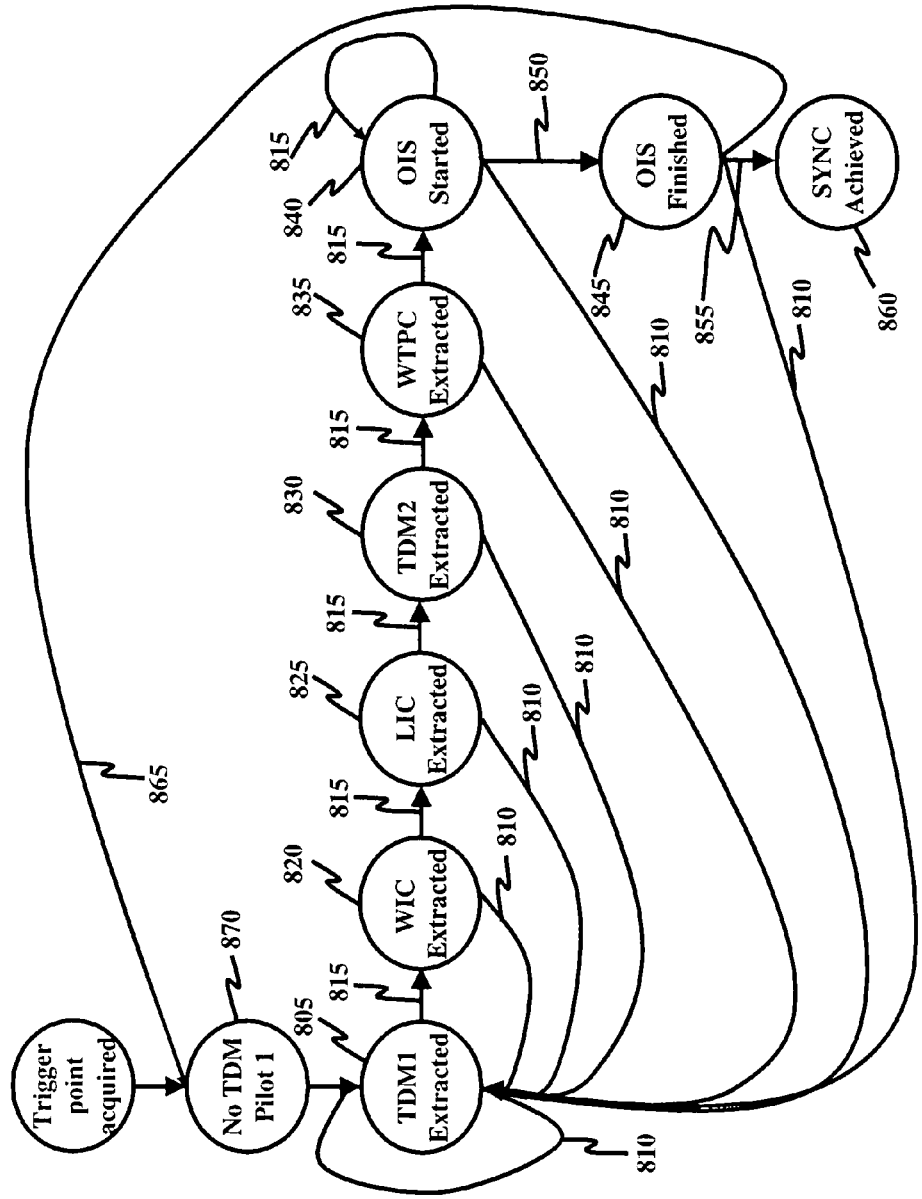
FIG. 8 illustrates a state diagram for an acquisition process in a MediaFLO™ system according to an embodiment herein.

FIG. 8, with reference to FIGS. 1 through 7, illustrates a state diagram for an acquisition process in a MediaFLO™ system in accordance with an embodiment herein. As illustrated, the receiver 120, on assuming the first investigated symbol to be a TDM pilot 1 symbol, enters a 'TDM Pilot 1 Extracted' state 805. At this state 805, the sparseness index of the symbol is determined and stored in memory in the receiver 120. The receiver 120 remains in the 'TDM Pilot 1 Extracted' state until a sparseness index of a newly received symbol is greater than the sparseness index 810. If the sparseness index of a newly received symbol is greater than the stored sparseness index 815, the receiver 120 goes through the states 'WIC Extracted' 820, 'LIC Extracted' 825, 'TDM Pilot 2 Extracted' 830, 'WTPC Extracted' 835, and 'OIS Started' 840. The receiver 120 remains in the 'OIS Started' state 840 in case the sparseness index of a newly received symbol is not greater than the stored sparseness index 815. From the 'OIS Started' state the receiver 120 moves to an 'OIS Finished' 845 state if five consecutive symbols have been processed and if the sparseness index of a newly received symbol is not greater than the stored sparseness index 850. In the 'OSI Finished' state 845 the receiver 120 determines the FCS fields of the OSI packets and if the FCS fields are correct and if the sparseness index of a newly received symbol is not greater than the stored sparseness index 855, the receiver 120 switches to a 'SYNC Achieved' state 860. In case the FCS fields are not correct and if the sparseness index of a newly received symbol is not greater than the stored sparseness index 865, the receiver 120 switches to a 'No TDM Pilot 1' state.

Figure 9:
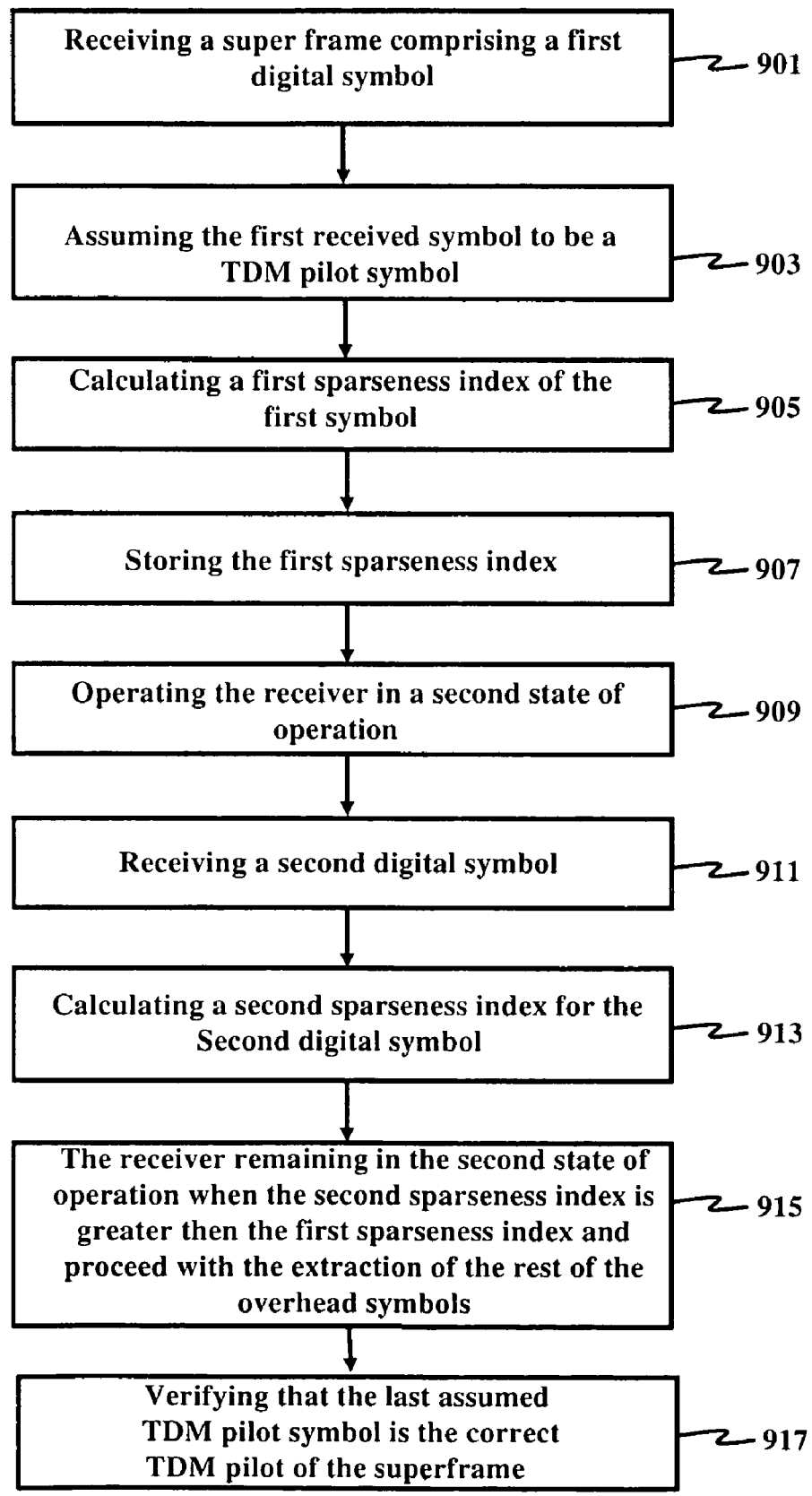
FIG. 9 is a flow diagram illustrating a preferred method according to an embodiment herein.

FIG. 9, with reference to FIGS. 1 through 8, illustrates a flow diagram illustrating method of acquisition in a MediaFLO™ (Forward Link Only) mobile multimedia multicast system according to an embodiment herein, wherein the method comprises receiving (901) a superframe 300 comprising a first digital symbol in a receiver 120 operating in a first state of operation; assuming (903) the first received digital symbol to be a Time Division Multiplexed (TDM) pilot symbol; calculating (905) a first sparseness index of the first symbol; storing (907) the first sparseness index; operating (909) the receiver 120 in a second state of operation; receiving (911) a second digital symbol; calculating (913) a second sparseness index for the second digital symbol; the receiver 120 remaining (915) in the second state of operation when the second sparseness index is greater than the first sparseness index, and proceeding with the extraction of the rest of the overhead symbols, wherein the second digital symbol is assumed to be the TDM pilot symbol; and verifying (917) that the last assumed TDM pilot symbol is the correct TDM pilot of the superframe 300.

Moreover, when the second sparseness index is less than the first sparseness index, then the method may further comprise the receiver 120 assuming the second digital symbol is a Wide-area Identification Channel (WIC) symbol 304; and the receiver 120 switching to a third state of operation. Furthermore, the method may further comprise receiving additional new digital symbols; comparing a sparseness index of each additional digital symbols with the first sparseness index; and the receiver 120 switching to the second state of operation whenever a sparseness index of a newly received digital symbol is greater than the first sparseness index.

Additionally, when the sparseness index of the newly received digital symbol is less than the first sparseness index, then the method may further comprise the receiver 120 switching to a fourth state of operation; the receiver 120 switching to a fifth state of operation upon completion of the fourth state of operation; the receiver 120 switching to a sixth state of operation upon completion of the fifth state of operation; and the receiver 120 switching to a seventh state of operation upon completion of the sixth state of operation.

Moreover, the method may further comprise the receiver 120 remaining in the seventh state of operation as long as each newly arriving digital symbol has a smaller sparseness index than the first sparseness index. Furthermore, the method may further comprise the receiver 120 switching to an eighth state of operation when the receiver 120 resides in the seventh state of operation for five consecutive received digital symbols. Additionally, the method may further comprise comparing a sparseness index of the newly received digital symbol with the first sparseness index; and when a sparseness index of the newly received digital signal is less than the first sparseness index, the method may further comprise performing a turbo-decoding process on Overhead Information symbols (OIS) of the superframe 300; and checking erasure fields of the superframe 300 for errors.

Moreover, when the erasure fields are correct, the method may further comprise the receiver 120 switching to a ninth state of operation which signifies an end of an acquisition phase, and wherein the last assumed TDM pilot symbol is determined to be the correct TDM pilot symbol. Furthermore, when the erasure fields are non-zero, then the method may further comprise the receiver 120 switching to the first state of operation; and the method repeating.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
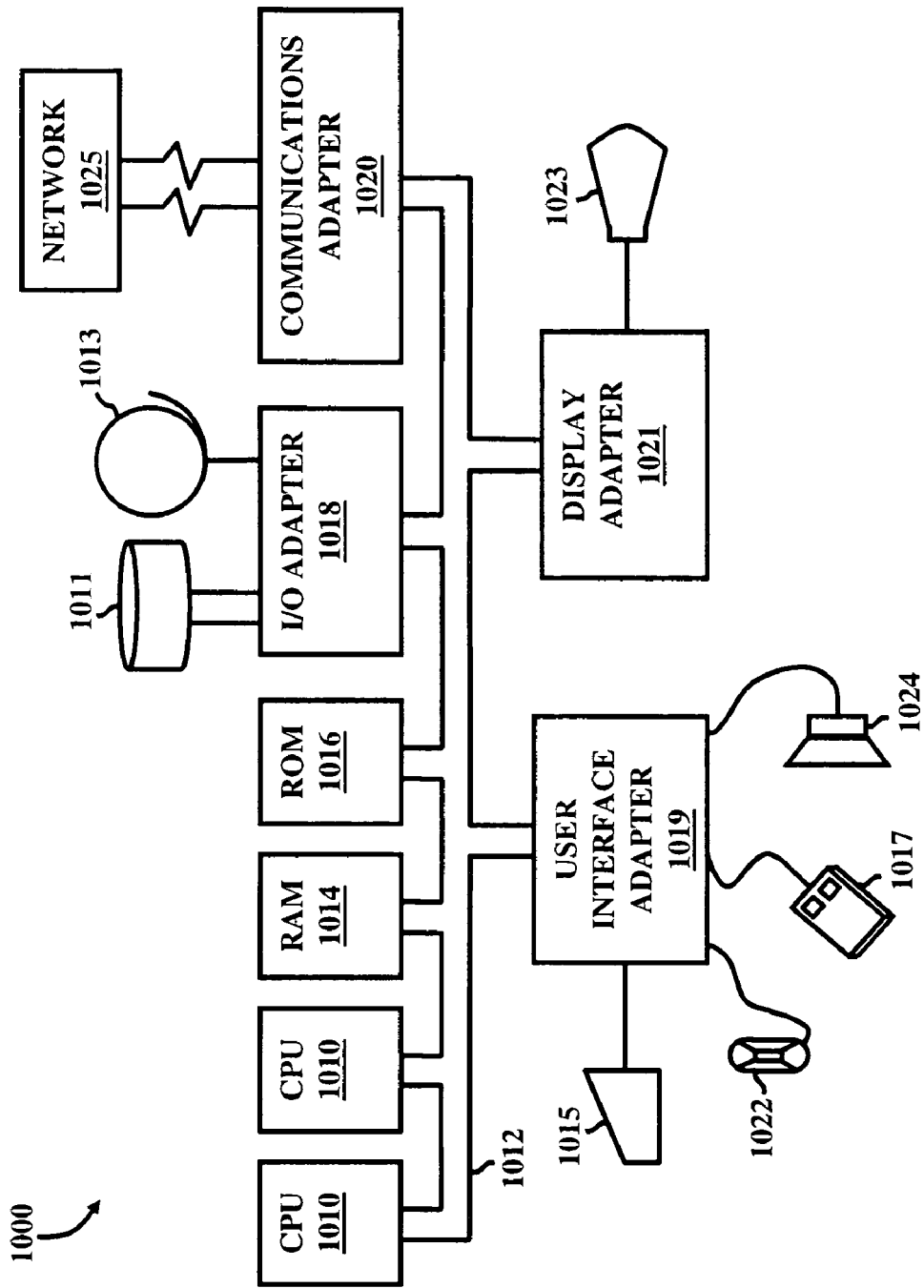
FIG. 10 illustrates a schematic diagram of a computer architecture used in accordance with the embodiments herein.

A representative hardware environment for practicing the embodiments herein is depicted in FIG. 10. This schematic drawing illustrates a hardware configuration of an information handling/computer system 1000 in accordance with the embodiments herein. The system 1000 comprises at least one processor or central processing unit (CPU) 1010. The CPUs 1010 are interconnected via system bus 1012 to various devices such as a random access memory (RAM) 1014, read-only memory (ROM) 1016, and an input/output (I/O) adapter 1018. The I/O adapter 1018 can connect to peripheral devices, such as disk units 1011 and tape drives 1013, or other program storage devices that are readable by the system 1000. The system 1000 can read the inventive instructions on the program storage devices and follow these instructions to execute the methodology of the embodiments herein. The system 1000 further includes a user interface adapter 1019 that connects a keyboard 1015, mouse 1017, speaker 1024, microphone 1022, and/or other user interface devices such as a touch screen device (not shown) to the bus 1012 to gather user input. Additionally, a communication adapter 1020 connects the bus 1012 to a data processing network 1025, and a display adapter 1021 connects the bus 1012 to a display device 1023 which may be embodied as an output device such as a monitor, printer, or transmitter, for example.

In acquiring the beginning of a superframe by using the embodiments described herein, the maximum acquisition time is 1 second. Thus, the embodiments described herein speed up the acquisition process, so that the receiver need not wait for the coming superframe to extract the next symbol.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of acquisition in a mobile multimedia multicast system, said method comprising:
   receiving a superframe comprising a first digital symbol in a receiver operating in a first state of operation;
   assuming the first received digital symbol to be a Time Division Multiplexed (TDM) pilot symbol;
   calculating a first sparseness index of said first symbol;
   storing said first sparseness index;
   operating said receiver in a second state of operation;
   receiving a second digital symbol;
   calculating a second sparseness index for said second digital symbol;
   said receiver remaining in said second state of operation when said second sparseness index is greater than said first sparseness index, wherein said second digital symbol is assumed to be said TDM pilot symbol;
   verifying that the last assumed TDM pilot symbol is the correct TDM pilot of said superframe,
   wherein when said second sparseness index is less than said first sparseness index, then said method further comprising:
      said receiver assuming said second digital symbol is a Wide-area Identification Channel (WIC) symbol; and
      said receiver switching to a third state of operation;
   receiving additional new digital symbols;
   comparing a sparseness index of each said additional digital symbols with said first sparseness index; and
   said receiver switching to said second state of operation whenever a sparseness index of a newly received digital symbol is greater than said first sparseness index,
   wherein when the sparseness index of said newly received digital symbol is less than said first sparseness index, then said method further comprising:
      said receiver switching to a fourth state of operation;
      said receiver switching to a fifth state of operation upon completion of said fourth state of operation;
      said receiver switching to a sixth state of operation upon completion of said fifth state of operation;
      said receiver switching to a seventh state of operation upon completion of said sixth state of operation; and
      said receiver remaining in said seventh state of operation as long as each newly arriving digital symbol has a smaller sparseness index than said first sparseness index.

2. The method of claim 1, further comprising said receiver switching to an eighth state of operation when said receiver resides in said seventh state of operation for five consecutive received digital symbols.

3. The method of claim 2, further comprising:
   comparing a sparseness index of said newly received digital symbol with said first sparseness index; and
   when a sparseness index of said newly received digital signal is less than said first sparseness index, said method further comprising:
      performing a turbo-decoding process on Overhead Information symbols (OIS) of said superframe; and
      checking erasure fields of said superframe for errors.

4. The method of claim 3, wherein when said erasure fields are correct, said method further comprising said receiver switching to a ninth state of operation which signifies an end of an acquisition phase, and wherein the last assumed TDM pilot symbol is determined to be the correct TDM pilot symbol.

5. The method of claim 3, wherein when said erasure fields are non-zero, then said method further comprising:
   said receiver switching to said first state of operation; and
   said method repeating.

6. A non-transitory program storage device readable by computer, and comprising a program of instructions executable by said computer to perform a method of acquisition in a mobile multimedia multicast system, said method comprising:
   receiving a superframe comprising a first digital symbol in a receiver operating in a first state of operation;
   assuming the first received digital symbol to be a Time Division Multiplexed (TDM) pilot symbol;
   calculating a first sparseness index of said first symbol;
   storing said first sparseness index;
   operating said receiver in a second state of operation;
   receiving a second digital symbol;
   calculating a second sparseness index for said second digital symbol;
   said receiver remaining in said second state of operation when said second sparseness index is greater than said first sparseness index, wherein said second digital symbol is assumed to be said TDM pilot symbol;
   verifying that the last assumed TDM pilot symbol is the correct TDM pilot of said superframe,
   wherein when said second sparseness index is less than said first sparseness index, then said method further comprising:
      said receiver assuming said second digital symbol is a Wide-area Identification Channel (WIC) symbol; and
      said receiver switching to a third state of operation;
   receiving additional new digital symbols;
   comparing a sparseness index of each said additional digital symbols with said first sparseness index; and
   said receiver switching to said second state of operation whenever a sparseness index of a newly received digital symbol is greater than said first sparseness index,
   wherein when the sparseness index of said newly received digital symbol is less than said first sparseness index, then said method further comprising:
      said receiver switching to a fourth state of operation;
      said receiver switching to a fifth state of operation upon completion of said fourth state of operation;
      said receiver switching to a sixth state of operation upon completion of said fifth state of operation;
      said receiver switching to a seventh state of operation upon completion of said sixth state of operation; and
      said receiver remaining in said seventh state of operation as long as each newly arriving digital symbol has a smaller sparseness index than said first sparseness index.

7. The program storage device of claim 6, wherein said method further comprising said receiving switching to an eighth state of operation when said receiver resides in said seventh state of operation for five consecutive received digital symbols.

8. The program storage device of claim 7, wherein said method further comprising:
   comparing a sparseness index of said newly received digital symbol with said first sparseness index; and
   when a sparseness index of said newly received digital signal is less than said first sparseness index, said method further comprising:

performing a turbo-decoding process on Overhead Information symbols (OIS) of said superframe; and checking erasure fields of said superframe for errors.

9. The program storage device of claim 8, wherein when said erasure fields are correct, said method further comprising said receiver switching to a ninth state of operation which signifies an end of an acquisition phase, and wherein the last assumed TDM pilot symbol is determined to be the correct TDM pilot symbol.

10. The program storage device of claim 8, wherein when said erasure fields are non-zero, then said method further comprising:

said receiver switching to said first state of operation; and
said method repeating.

11. A receiver comprising a processor configured to:

receive a superframe comprising a first digital symbol in said receiver operating in a first state of operation;
assume the first received digital symbol to be a Time Division Multiplexed (TDM) pilot symbol;
calculate a first sparseness index of said first symbol;
store said first sparseness index;
operate said receiver in a second state of operation;
receive a second digital symbol;
calculate a second sparseness index for said second digital symbol, wherein said receiver remains in said second state of operation when said second sparseness index is greater than said first sparseness index, wherein said second digital symbol is assumed to be said TDM pilot symbol;
verify that the last assumed TDM pilot symbol is the correct TDM pilot of said superframe,
wherein when said second sparseness index is less than said first sparseness index, then said processor is further configured to:
assume said second digital symbol is a Wide-area Identification Channel (WIC) symbol; and
switch to a third state of operation;
receive additional new digital symbols;
compare a sparseness index of each said additional digital symbols with said first sparseness index; and
switch to said second state of operation whenever a sparseness index of a newly received digital symbol is greater than said first sparseness index,
wherein when the sparseness index of said newly received digital symbol is less than said first sparseness index, then said processor is further configured to:
switch to a fourth state of operation;
switch to a fifth state of operation upon completion of said fourth state of operation;
switch to a sixth state of operation upon completion of said fifth state of operation;
switch to a seventh state of operation upon completion of said sixth state of operation; and
remain in said seventh state of operation as long as each newly arriving digital symbol has a smaller sparseness index than said first sparseness index.

12. The receiver of claim 11, wherein said receiver performs acquisition in a mobile multimedia multicast system.

13. The receiver of claim 11, wherein said processor is further configured to switch to an eighth state of operation when said receiver resides in said seventh state of operation for five consecutive received digital symbols.

14. The receiver of claim 13, wherein said processor is further configured to:

compare a sparseness index of said newly received digital symbol with said first sparseness index; and
when a sparseness index of said newly received digital signal is less than said first sparseness index, said processor is further configured to:
perform a turbo-decoding process on Overhead Information symbols (OIS) of said superframe; and
check erasure fields of said superframe for errors.

15. The receiver of claim 14, wherein when said erasure fields are correct, said processor is further configured to switch to a ninth state of operation which signifies an end of an acquisition phase, and wherein the last assumed TDM pilot symbol is determined to be the correct TDM pilot symbol.

16. The receiver of claim 14, wherein when said erasure fields are non-zero, then said processor is further configured to switch to said first state of operation.

* * * * *